US006731235B2

(12) United States Patent
Kishida et al.

(10) Patent No.: US 6,731,235 B2
(45) Date of Patent: May 4, 2004

(54) MISPAIRING DETERMINATION AND SIGNAL PROCESSING METHOD FOR FM-CW RADAR

(75) Inventors: Masayuki Kishida, Kobe (JP); Yasuhiro Sekiguchi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/313,838

(22) Filed: Dec. 4, 2002

(65) Prior Publication Data

US 2003/0122702 A1 Jul. 3, 2003

(30) Foreign Application Priority Data

Dec. 4, 2001 (JP) ........................... 2001-370212

(51) Int. Cl.⁷ .................... G01S 13/536; G01S 13/56; G01S 13/93
(52) U.S. Cl. .................. 342/128; 342/70; 342/104; 342/105; 342/118; 342/175; 342/195; 342/196
(58) Field of Search .................. 701/300, 301; 180/167, 168, 169; 342/27, 28, 70, 71, 72, 118, 147, 159, 165, 166, 167–175, 192–197, 104, 105, 107, 109–116

(56) References Cited

U.S. PATENT DOCUMENTS

| | | | | |
|---|---|---|---|---|
| 5,619,208 A | * | 4/1997 | Tamatsu et al. | 342/70 |
| 6,072,422 A | * | 6/2000 | Yamada | 342/70 |
| 6,104,336 A | | 8/2000 | Curran et al. | |
| 6,140,954 A | * | 10/2000 | Sugawara et al. | 342/70 |
| 6,204,803 B1 | * | 3/2001 | Uehara | 342/70 |
| 6,229,474 B1 | * | 5/2001 | Uehara | 342/70 |
| 6,320,531 B1 | * | 11/2001 | Tamatsu | 342/109 |

FOREIGN PATENT DOCUMENTS

| | | |
|---|---|---|
| EP | 0 773 452 A1 | 3/1997 |
| EP | 0 932 052 A2 | 7/1999 |
| JP | 11-337635 A | 12/1999 |
| JP | 11-344559 A | 12/1999 |
| JP | 2000-65921 A | 3/2000 |

* cited by examiner

Primary Examiner—Bernarr E. Gregory
(74) Attorney, Agent, or Firm—Fogg & Associates, LLC; Laura A. Ryan (57) ABSTRACT

When a new target is detected, if it is determined that the distance difference between the newly detected target and the previously detected target is within a predetermined range, the difference between the relative velocity of the newly detected target and the relative velocity of the previously detected target is obtained to determine whether the difference is greater than a predetermined value $\Delta V_a$, and when the difference is greater than the predetermined value, it is determined that the new target is a target obtained as a result of mispairing. Further, when the difference between the relative velocity of the newly detected target and the relative velocity of the previously detected target is greater than the predetermined value $\Delta V_a$, then the difference between a distance derivative of the newly detected target over a prescribe time and the relative velocity of the previously detected target is obtained, and when the difference is greater than a predetermined value $\Delta V_b$ which is smaller than the predetermined value $\Delta V_a$, it is determined that the new target is a target obtained as a result of mispairing.

6 Claims, 9 Drawing Sheets

Fig.10

MISPAIRING DETERMINATION AND SIGNAL PROCESSING METHOD FOR FM-CW RADAR

This application claims priority to Japanese Patent Application No. 2001-370212 filed on Dec. 4, 2001.

BACKGROUND OF THE INVENTION

1. Field of the Invention

The present invention relates to a signal processing method for an FM-CW radar and, more particularly, to a method for determining whether mispairing has occurred when pairing is done in a situation where there are a plurality of reflecting points from a target. The invention also relates to a signal processing method to be implemented when it is determined that mispairing has occurred.

2. Description of the Related Art

FM-CW radar transmits a triangular-shaped frequency-modulated continuous wave to determine the distance to a target, such as a vehicle, traveling ahead. More specifically, the transmitted wave from the radar is reflected by the vehicle ahead, and a beat signal (radar signal) occurring between the received reflected wave signal and the transmitted signal is obtained. This beat signal is fast Fourier transformed to analyze the frequency. The frequency-analyzed beat signal exhibits a peak at which the power becomes large in correspondence with the target; the frequency corresponding to this peak is called the peak frequency. The peak frequency carries information concerning the distance, and the peak frequency differs between the rising portion and falling portion of the triangular FM-CW wave due to the Doppler effect associated with the relative velocity with respect to the vehicle ahead. The distance and relative velocity with respect to the vehicle ahead are obtained from the peak frequencies in the rising and falling portions. When there is more than one vehicle traveling ahead, a pair of peak frequencies in the rising and falling portions is generated for each vehicle. Forming pairs of peak frequencies in the rising and falling portions is called the pairing.

When the target is a large vehicle such as a truck, a plurality of beams are reflected from the target, and the distances to the respective reflecting points differ depending on their positions on the vehicle. In this case, the distance and the relative velocity must be detected for each reflecting point by pairing the signals between the rising and falling portions based on the peaks occurring due to the beam reflected from the same reflecting point.

However, when a plurality of reflecting points are present, there is a possibility that a peak signal in the rising portion from a certain reflecting point may be erroneously paired, or mispaired, with a peak signal in the falling portion from another reflecting point near that reflecting point, instead of pairing the peak signal in the rising portion with the peak signal in the falling portion from the same reflecting point. Accordingly, an object of the present invention is to provide a method that accurately determines whether or not a mispairing has occurred when pairing is done, and also a method which, if it is determined that a mispairing has occurred, rejects data obtained as a result of the mispairing and thus prevents the data from being used for target computation.

SUMMARY OF THE INVENTION

To solve the above problem, according to the FM-CW radar mispairing determination method of the present invention, when a new target is detected, it is determined whether a distance difference between the newly detected target and a previously detected target is within a predetermined range, and when the distance difference is determined as being within the predetermined range, then the difference between the relative velocity of the newly detected target and the relative velocity of the previously detected target is obtained to determine whether the difference is greater than a predetermined value $\Delta V_a$ wherein, when the difference is greater than the predetermined value, it is determined that the new target is a target obtained as a result of mispairing.

Further, when the difference between the relative velocity of the newly detected target and the relative velocity of the previously detected target is greater than the predetermined value $\Delta V_a$, then the difference between a distance derivative of the newly detected target over a prescribe time and the relative velocity of the previously detected target is obtained, and when the difference is greater than a predetermined value $\Delta V_b$ which is smaller than the predetermined value $\Delta V_a$, it is determined that the new target is a target obtained as a result of mispairing.

In the above method, it is determined whether the distance difference between the newly detected target and the previously detected target is within the predetermined range but, in addition to the distance difference, a lateral position difference is also compared with a predetermined range to determine if it is within the predetermined range.

Further, in the above method, a time t required for relative distance to change by a prescribed value is obtained based on the relative velocity of the previously detected target, an amount by which the relative distance to the new target has actually changed during the time t from the time the new target was detected is obtained, and the distance derivative is obtained based on the amount of change of the relative distance.

Here, the time t can be obtained by obtaining relative acceleration from the relative velocity of the previously detected target and thereby predicting the relative velocity after a prescribed time, and by applying a correction considering the amount of change of the relative velocity over the prescribed time.

Further, according to the signal processing method of the present invention, when it is determined that a mispairing has occurred, parameters obtained from the target determined as having occurred due to the mispairing are rejected so that the parameters will not be used for combining or control operations.

According to the present invention, whether a mispairing has occurred or not can be determined accurately. If it is determined that a mispairing has occurred, parameters such as relative distance, relative velocity, etc. obtained from the mispairing are rejected and are not used for target computation; as a result, correct data concerning the target can be obtained.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
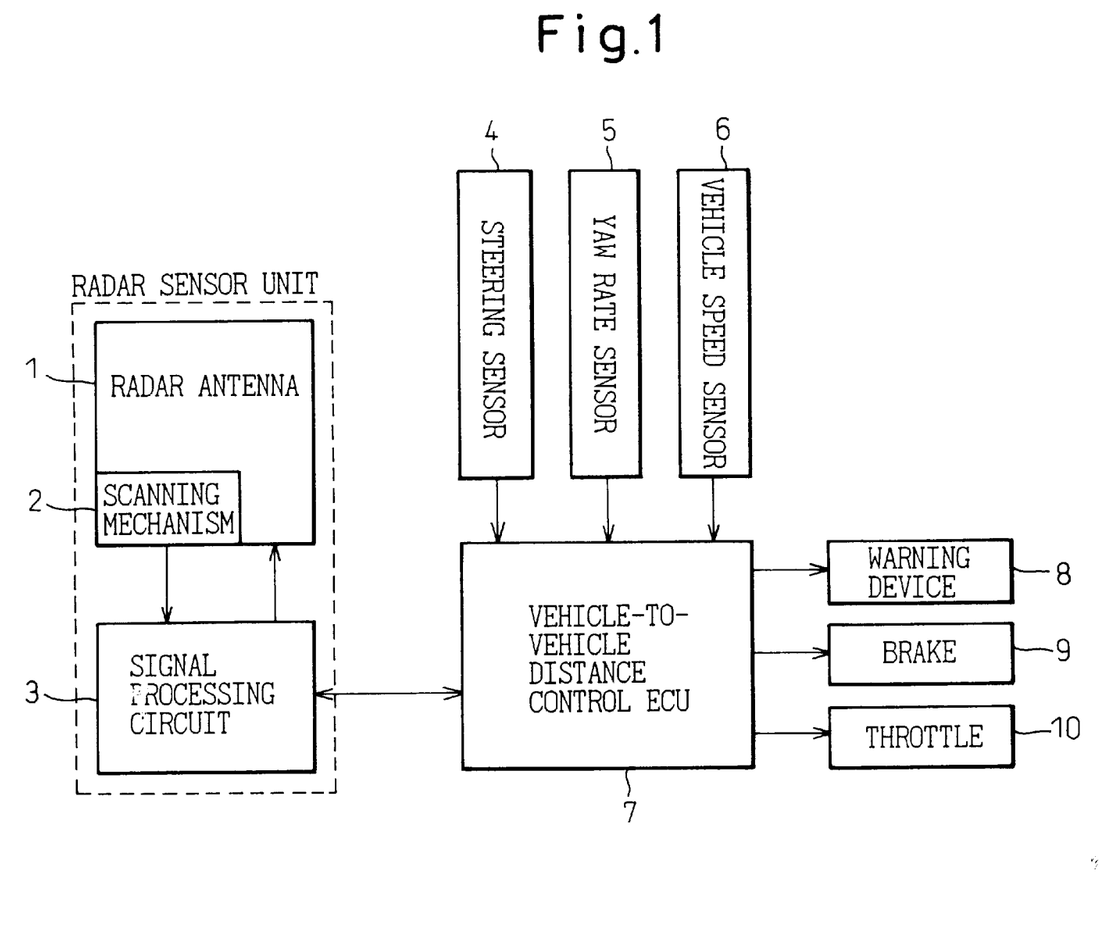
FIG. 1 is a diagram showing an overview of the configuration of a vehicle-to-vehicle distance control system employing the method of the present invention.

FIG. 1 is a diagram showing an overview of the configuration of a vehicle-to-vehicle distance control system using a radar in which the method of the present invention is employed. A radar sensor unit is an FM-CW radar, and includes a radar antenna 1, a scanning mechanism 2, and a signal processing circuit 3. A vehicle-to-vehicle distance control ECU 7 receives signals from a steering sensor 4, a yaw rate sensor 5, and a vehicle speed sensor 6 as well as from the signal processing circuit 3 in the radar sensor unit, and controls a warning device 8, a brake 9, a throttle 10, etc. The vehicle-to-vehicle distance control ECU 7 also sends a signal to the signal processing circuit 3 in the radar sensor unit.

Figure 2:
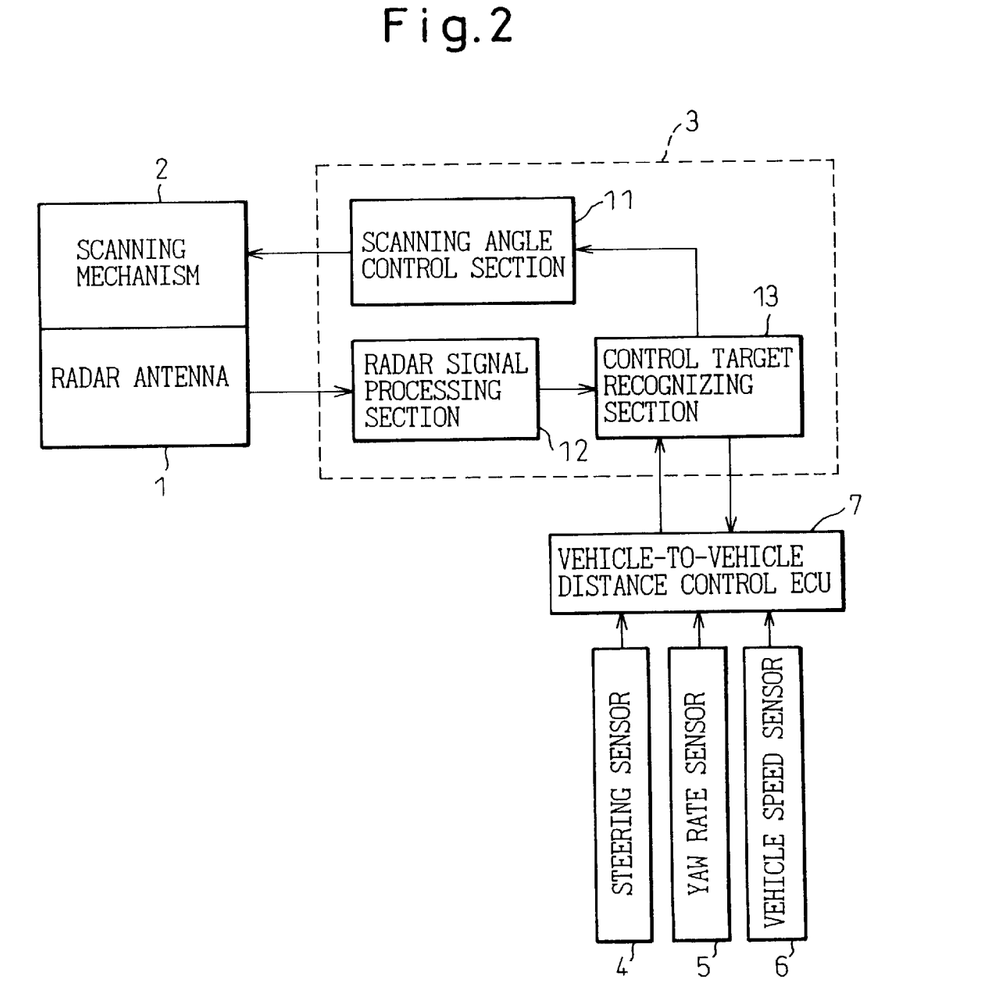
FIG. 2 is a diagram showing the configuration of a signal processing circuit 3 of FIG. 1.

FIG. 2 is a diagram showing the configuration of the signal processing circuit 3 of FIG. 1. The signal processing circuit 3 comprises a scanning angle control section 11, a radar signal processing section 12, and a control target recognizing section 13. The radar signal processing section 12 applies an FFT to the reflected signal received by the radar antenna 1, detects the power spectrum, computes the distance and relative velocity of the target, and supplies the resulting data to the control target recognizing section 13. Based on the distance and relative velocity of the target supplied from the radar signal processing section 12, and vehicle information detected by the steering sensor 4, yaw rate sensor 5, vehicle speed sensor 6, etc. and supplied from the vehicle-to-vehicle distance control ECU 7, the control target recognizing section 13 identifies the control target and supplies the result to the vehicle-to-vehicle distance control ECU while, at the same time, providing a commanded scanning angle to the scanning angle control section 11. The scanning angle control section 11 is one that, in the case of a fixed type radar, controls the beam projection angle, etc. when the vehicle is traveling around a curve and, in the case of a scanning radar, controls the beam scanning angle. In response to the control signal from the scanning angle control section 11, the scanning control mechanism 2 performs scanning by sequentially projecting the beam at the commanded angle.

FM-CW radar transmits a continuous wave frequency-modulated, for example, in a triangular pattern, to determine the distance to a target such as a vehicle traveling ahead. More specifically, the transmitted wave from the radar is reflected by the vehicle ahead, and the reflected signal is received and mixed with a portion of the transmitted signal to produce a beat signal (radar signal). This beat signal is fast Fourier transformed to analyze the frequency. The frequency-analyzed beat signal exhibits a peak at which the power becomes large in correspondence with the target; the frequency corresponding to this peak is called the peak frequency. The peak frequency carries information concerning the distance, and the peak frequency differs between the rising portion and falling portion of the triangular FM-CW wave due to the Doppler effect associated with the relative velocity with respect to the vehicle ahead. The distance and relative velocity with respect to the vehicle ahead are obtained from the peak frequencies in the rising and falling portions. When there is more than one vehicle traveling ahead, a pair of peak frequencies in the rising and falling portions is generated for each vehicle. Forming pairs of peak frequencies in the rising and falling portions is called pairing.

Figure 3A:
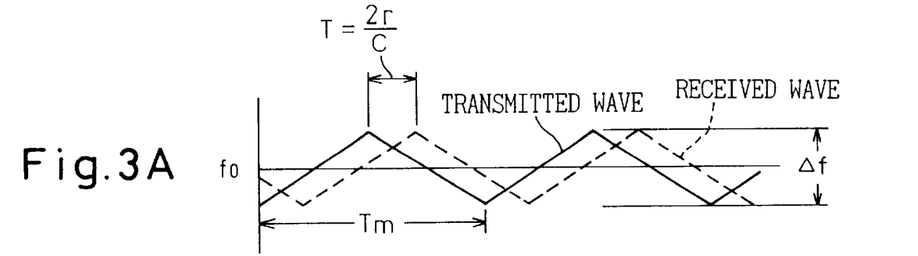
FIGS. 3A to 3C are diagrams for explaining the principle of FM-CW radar when the relative velocity with respect to target is 0.
Figure 3B:
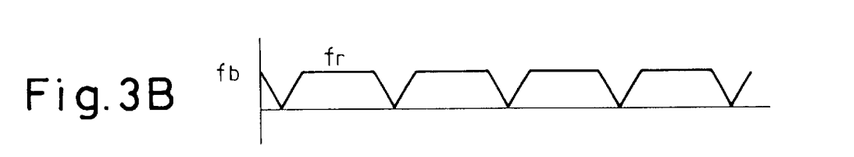
Figure 3C:
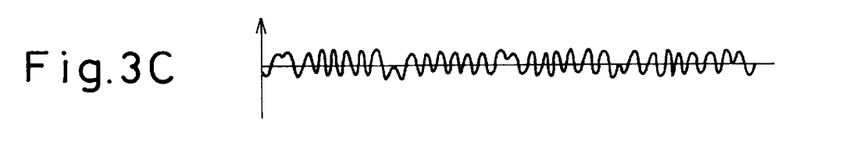

FIGS. 3A to 3C are diagrams for explaining the principle of the FM-CW radar when the relative velocity with respect to the target is 0. The transmitted wave is a triangular wave whose frequency changes as shown by a solid line in FIG. 3A. In the figure, $f_0$ is the transmit center frequency of the transmitted wave, $\Delta f$ is the FM modulation width, and Tm is the repetition period. The transmitted wave is reflected from the target and received by the antenna; the received wave is shown by a dashed line in FIG. 3A. The round trip time T to and from the target is given by T=2r/C, where r is the distance to the target and C is the velocity of radio wave propagation.

Here, the received wave is shifted in frequency from the transmitted signal (i.e., produces a beat) according to the distance between the radar and the target.

The beat signal frequency component fb can be expressed by the following equation.

$$fb = fr = (4 \cdot \Delta f / C \cdot Tm) r$$

where fr is the frequency due to the range (distance).

Figure 4A:
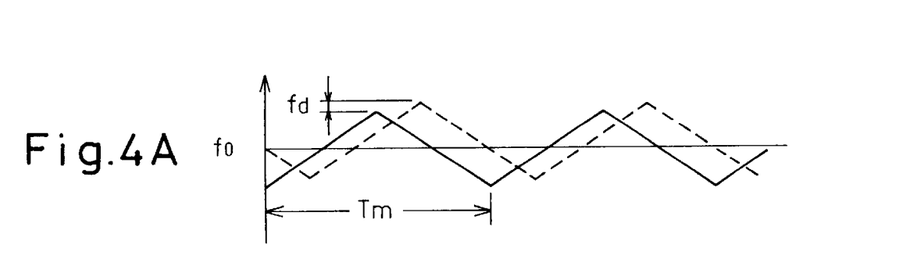
FIGS. 4A to 4C are diagrams for explaining the principle of FM-CW radar when the relative velocity with respect to target is v.
Figure 4B:
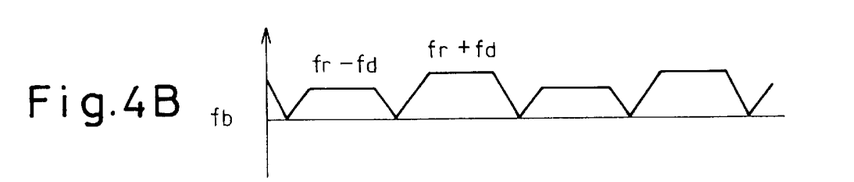
Figure 4C:
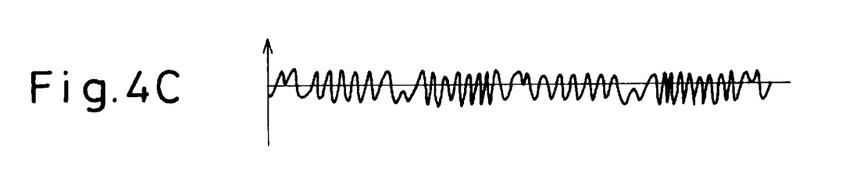

FIGS. 4A to 4C, on the other hand, are diagrams for explaining the principle of the FM-CW radar when the relative velocity with respect to the target is v. The frequency of the transmitted wave changes as shown by a solid line in FIG. 4A. The transmitted wave is reflected from the target and received by the antenna; the received wave is shown by a dashed line in FIG. 4A. Here, the received wave is shifted in frequency from the transmitted signal (i.e., produces a beat) according to the distance between the radar and the target. In this case, as the relative velocity with respect to the target is v, a Doppler shift occurs, and the beat frequency component fb can be expressed by the following equation.

$$fb = fr \pm fd = (4 \cdot \Delta f / C \cdot Tm) r \pm (2 \cdot f_0 / C) v$$

where fr is the frequency due to the distance, and fd is the frequency due to the velocity.

Figure 5:
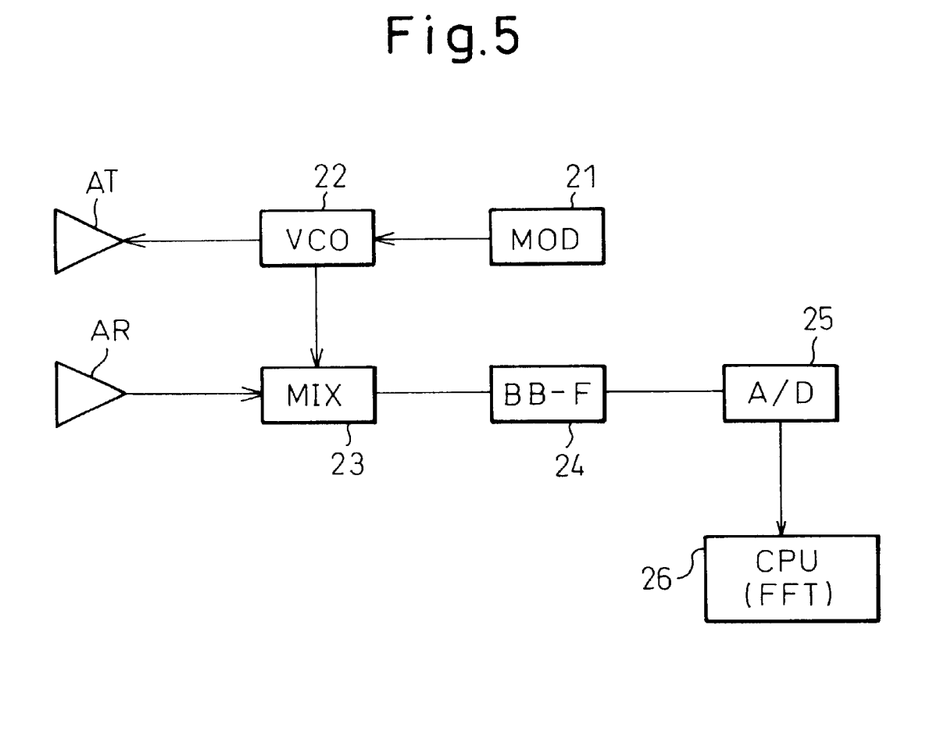
FIG. 5 is a diagram showing an example of the configuration of the FM-CW radar.

FIG. 5 is a diagram showing an example of the configuration of the FM-CW radar. As shown, a modulating signal generator 21 applies a modulating signal to a voltage-controlled oscillator 22 for frequency modulation, and the frequency-modulated wave is transmitted via the transmitting antenna AT, while a portion of the transmitted signal is separated and directed into a frequency converter 23 which functions as a mixer. The signal reflected from a target, such as a vehicle traveling ahead, is received via the receiving antenna AR, and the received signal is mixed in the frequency converter 23 with the output signal of the voltage-controlled oscillator 22 to produce a beat signal. The beat signal is passed through a baseband filter 24, and is converted by an A/D converter 25 into a digital signal; the digital signal is then supplied to a CPU 26 where signal processing such as a fast Fourier transform is applied to the digital signal to obtain the distance and the relative velocity of the target.

(Embodiment)

Figure 6:
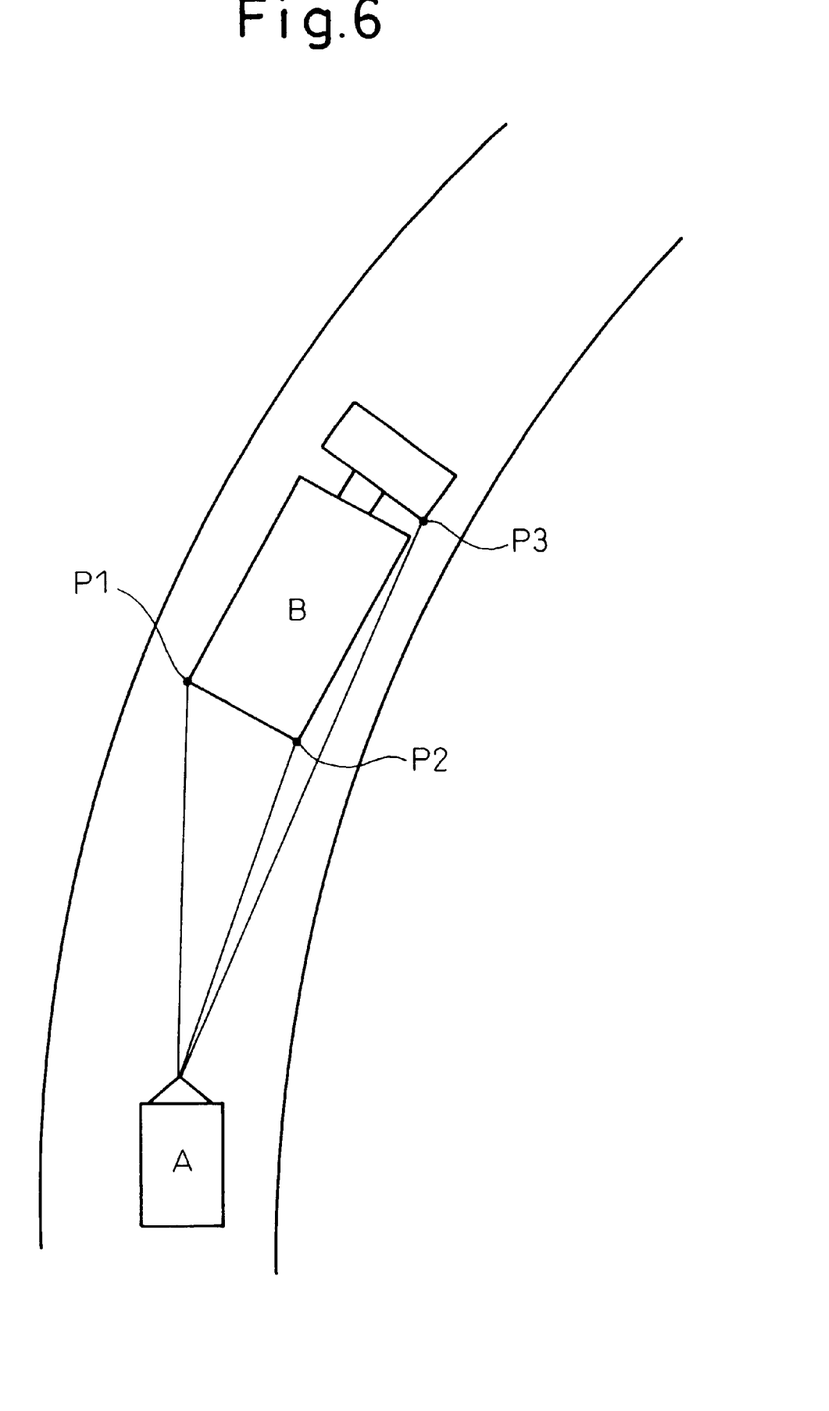
FIG. 6 is a diagram showing an example in which a plurality of reflections are detected from the same target.

When the target is a large vehicle such as a truck, a plurality of beams are reflected from the target and, as shown in FIG. 6, the distances to the respective reflecting points differ depending on their positions on the vehicle. The beam projected from the radar-equipped vehicle A is reflected at positions P1, P2, and P3 on the large vehicle B traveling ahead, as shown in FIG. 6. As can be seen, the distances to these reflecting points differ according to their positions. When a plurality of vehicles are traveling ahead, the beam may be reflected from the respective vehicle, in which case also the distances to the respective reflecting points differ. As a result, the distance and the relative velocity cannot be detected accurately, unless the signals in the rising and falling portions are paired up based on the beam reflected from the same reflecting point.

Figure 7:
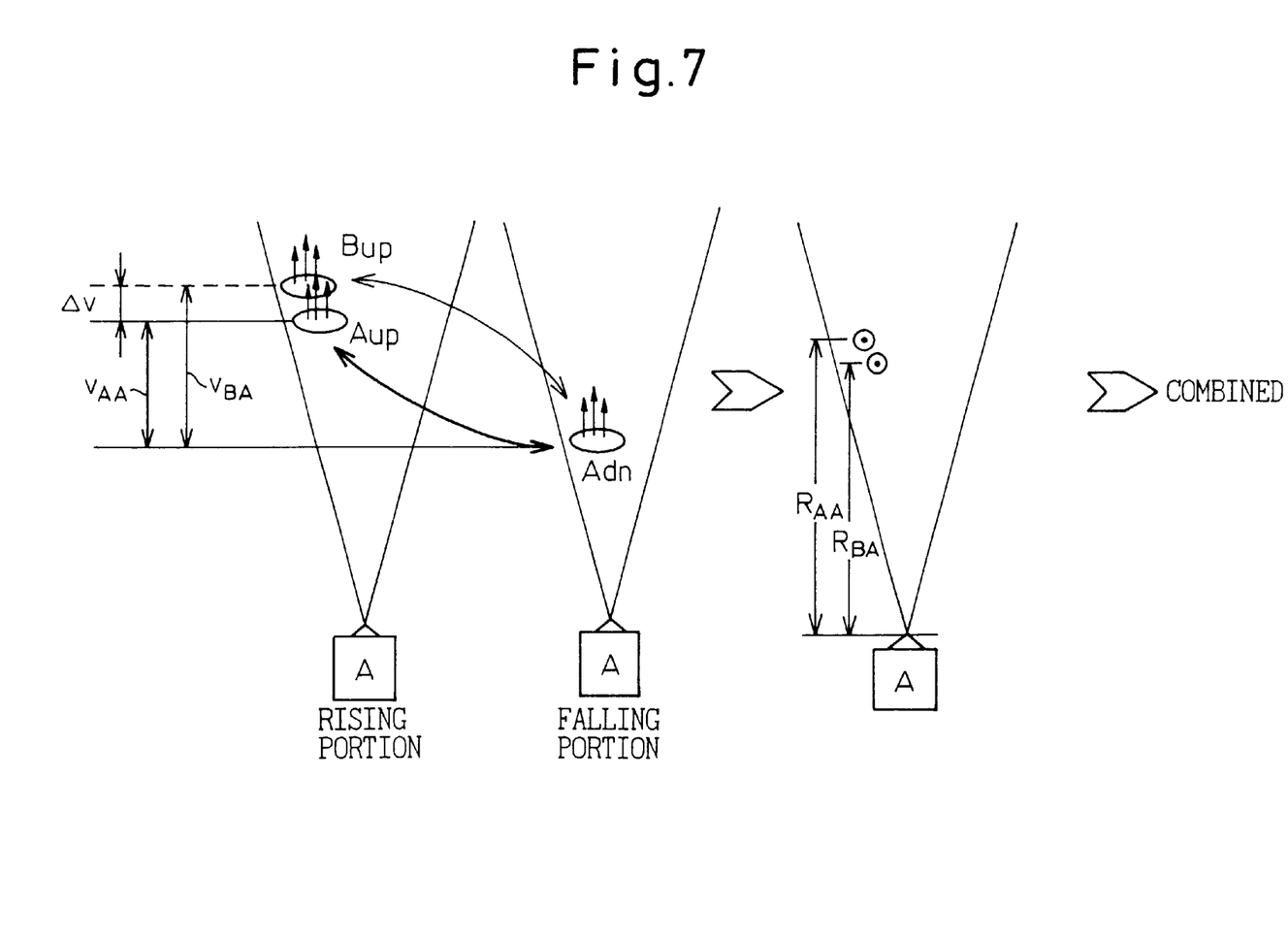
FIG. 7 is a diagram for explaining a mispairing.

For example, when there are peaks Aup and Bup in the rising portion and a peak Adn in the falling portion, as shown in FIG. 7, if Bup is paired with Adn instead of correctly paring Aup with Adn, then the target position, that is, the distance from the radar-equipped vehicle A, will be measured as RBA when actually it is RAA. Further, the relative velocity will also be measured incorrectly.

In FIG. 7, the spacing $V_{AA}$ between Aup and Adn, the correct pairing, indicates the relative velocity of the target with respect to the radar-equipped vehicle. On the other hand, in the case of mispairing, the relative velocity is given by the spacing $V_{BA}$ between Bup and Adn.

When the target is a large vehicle, parameters such as a plurality of distances, relative velocities, etc. obtained from a plurality of peaks of reflections from the same target are combined and, from the combined value, the average value of the plurality of values is determined and a parameter, such as the target's distance, relative velocity, or lateral position or the like, is computed. However, if parameters obtained as a result of mispairing are used, the target parameter obtained by combining these parameters deviates from the correct target parameter. For example, the distance to the target becomes different from the actual distance.

The present invention uses the following method to determine whether a mispairing has occurred or not.

Figure 8:
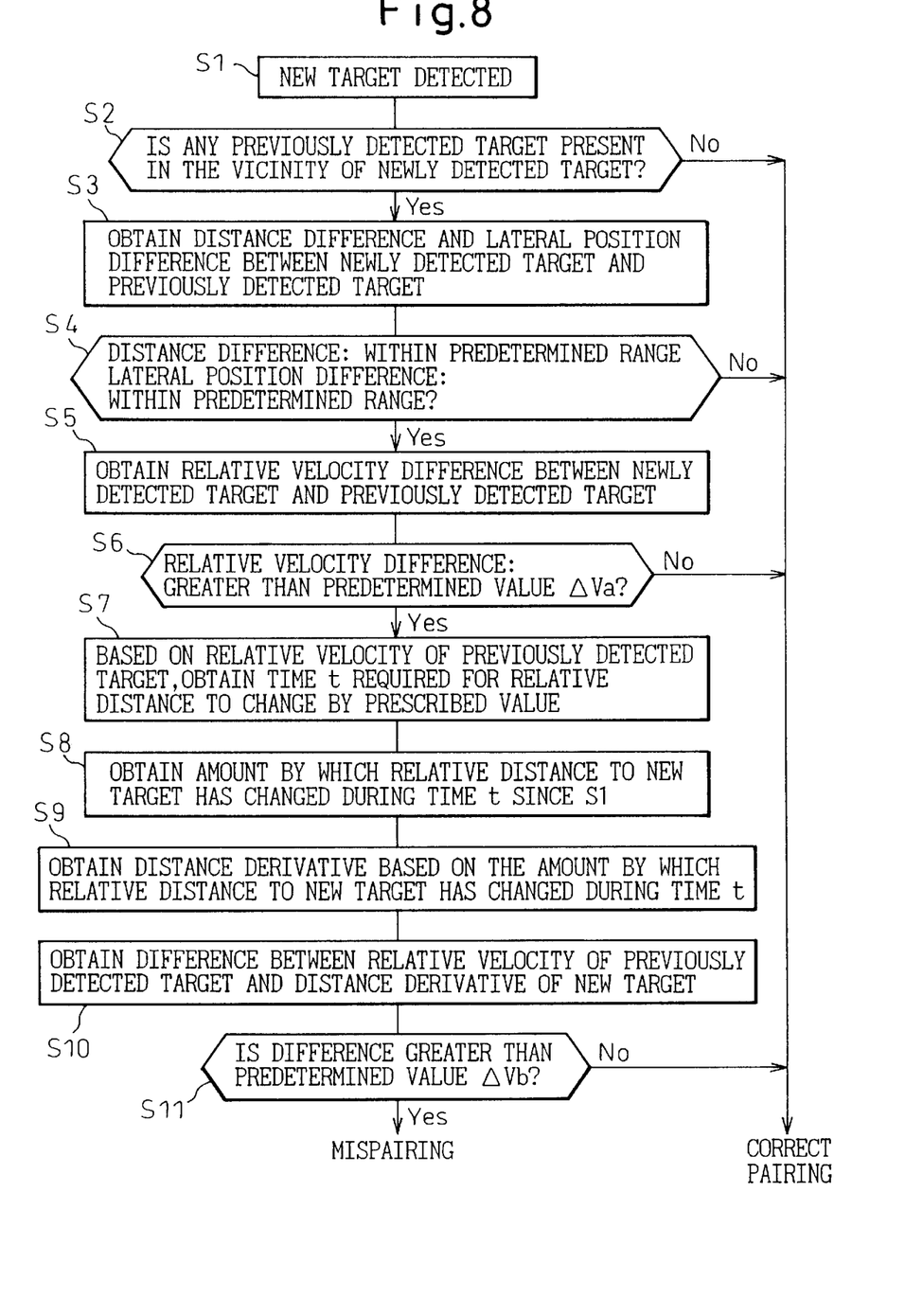
FIG. 8 is a flowchart illustrating a mispairing rejected pairing method according to the present invention.

FIG. 8 is a flowchart illustrating a mispairing rejection method according to the present invention. In the flowchart, control or decision-making operations in the respective steps are performed in the signal processing circuit 3 shown in FIG. 1.

First, when a new target is detected (S1), it is determined whether any previously detected target, that is, any target detected in the last routine or in the routine before last, is present in the vicinity of the new target (S2). If the answer is No, as the new target is some distance away from the previously detected target, there is no concern of mispairing and, therefore, it is determined that correct pairing has been done. On the other hand, if the answer is Yes in S2, the difference between the distance to the previously detected target and the distance to the newly detected target (distance difference) and the difference in lateral position between them (lateral position difference) are obtained (S3). The lateral position usually indicates the position of the width center of the target.

Next, it is determined whether the distance difference and the lateral position difference are within respectively predetermined ranges (S4). In this step, only the distance difference may be checked to see if it is within the predetermined range. The predetermined range is, for example, "−5 m to +20 m" in the case of the distance difference. The reason for this is that, when the large vehicle is about 15 m long, if the new target is located more than 5 m behind or in front of the large vehicle, that is, if the distance difference is outside the range of "−5 m to +20 m", the new target can be determined as being a different target. Further, as the vehicle width is about 2 m in many cases, if the lateral position difference is outside the range of "−2 m to +2 m", the new target is determined as being a different target. If the answer is No in S4, as the distance and the lateral position are substantially different from those of the previously detected target, it is determined that the new target is a target different from the previously detected target, that is, correct pairing has been done for the new target. On the other hand, if the answer is Yes in S4, as a mispairing is suspected, the difference between the relative velocity of the previously detected target and that of the newly detected target is obtained (S5). Then, it is determined whether the relative velocity difference is greater than a predetermined value $\Delta V_a$ (S6). In this case, it is determined whether the relative velocity difference is greater than 8.3 km/h, for example.

As explained with reference to FIG. 7, there occurs a difference between the relative velocity $V_{BA}$ obtained from mispairing and the relative velocity $V_{AA}$ obtained from correct pairing. Accordingly, whether mispairing has occurred or not can be determined by comparing the relative velocity of the newly detected target with that of the previously detected target.

In S6, the relative velocity difference is checked to see if it is greater than 8.3 km/h, for example. The value of 8.3 km/h is based on the empirically obtained greatest difference between the previously detected relative velocity (detected in the last routine or in the routine before last) and the newly detected relative velocity (detected in the present routine) when the newly detected target can be considered as being the same target.

If the answer is No in S6, the relative velocity difference is small and the newly detected target can be considered as being the same target as the previously detected target, so that it is determined that correct pairing has been done. On the other hand, if the answer is Yes, the relative velocity difference between the previously detected target and the newly detected target is large and a mispairing is suspected, so that the process proceeds to S7 for further checking.

In S7, the time t required for a relative distance to change by a prescribed value (for example, 5 m) is obtained based on the relative velocity of the previously detected target. More specifically, the time t that is required for the relative distance to increase or decrease by 5 m, for example, is obtained using the relative velocity of the previously detected target with respect to the radar-equipped vehicle. The time t can be obtained by the following equation.

$$t=\text{(Value of relative distance that changes)}/\text{(Relative velocity of the previously detected target)}$$

Next, the amount of change is obtained that has actually occurred in the relative distance to the newly detected target during the period of time t from the time the new target was detected (i.e., the time of S1) (S8). Then, a distance derivative is obtained based on the amount of change that has occurred in the relative distance between the newly detected target and the radar-equipped vehicle during the period of time t (S9). If the relative distance has changed by r during the period of time t, for example, the distance derivative vt, that is, the amount of change in the relative distance during the period of time t, is obtained by the following equation.

$$vt = \text{(Amount of change in relative distance during time } t{:}r)/t$$

As can be seen from this equation, the distance derivative vt represents the average value of the relative velocity of the new target during the period of time t. In S5 also, the relative velocity of the new target has been obtained, but the value obtained in S5 is the relative velocity at that instant in time, not the average value of the relative velocity.

Next, the difference is obtained between the relative velocity of the previously detected target (measured when the target was detected) and the distance derivative vt (obtained in S9) representing the average relative velocity of the newly detected target over the period of time t (S10). Then, it is determined whether the difference is greater than a predetermined value $\Delta V_b$, for example, 5.0 km/h (S11). Here, $\Delta V_b$ is set smaller than $\Delta V_a$. The value of 5.0 km/h is smaller than the predetermined value $\Delta V_a$ (in the illustrated example, 8.3 km/h) used in S6, and is presented as an example of the value that can determine more strictly whether a mispairing has occurred or not. If the answer is Yes in S11, as the relative velocity difference between the previously detected target and the newly detected target is large, it is determined that a mispairing has occurred. In the case of FIG. 7, if the difference $\Delta V$ between the relative velocity $V_{AA}$ of the target (corresponding to the previously detected target) obtained from correct pairing and the relative velocity of the newly detected target is greater than the predetermined value $\Delta V_b$, the relative velocity of the newly detected target is determined as being the relative velocity (corresponding to $V_{BA}$ in FIG. 7) obtained from mispairing.

On the other hand, if the answer is No, the relative velocity difference is small, so that it is determined that correct pairing has been done. Then, the parameters such as relative distance, relative velocity, etc. obtained from the target determined as having occurred due to mispairing are rejected so that they will not be used for target parameter computation.

In the flowchart of the present invention, it is determined in S6 whether the relative velocity difference is greater than the larger predetermined value $\Delta V_a$ (for example, 8.3 km/h), and if it is greater than the predetermined value, that is, if the difference is large, mispairing is suspected, so that the process proceeds to S7 and subsequent steps for further checking. Then, in S11, the difference between the relative velocity of the previously detected target and the distance derivative representing the average relative velocity of the newly detected target is compared with the other predetermined value $\Delta V_b$ which is smaller than the predetermined value used in S6, and if the difference is greater than the smaller predetermined value, it is determined that mispairing has occurred.

Figure 9:
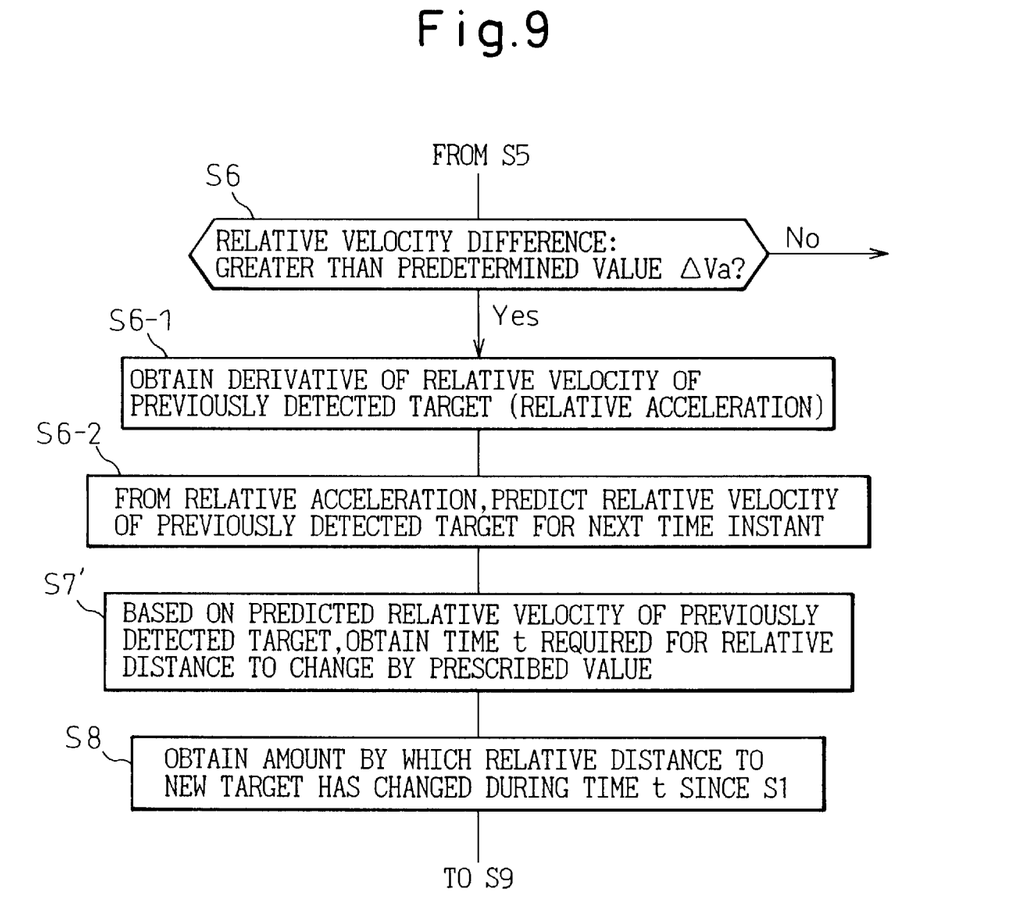
FIG. 9 is a flowchart showing a modified example of the mispairing rejected pairing method according to the present invention.

FIG. 9 is a flowchart showing a modified example of the mispairing rejection method according to the present invention. In the flowchart, control or decision-making operations in the respective steps are performed in the signal processing circuit 3 shown in FIG. 1.

In FIG. 9, the process between S6 and S8 differs from the corresponding process in the flowchart of FIG. 8. In FIG. 9, if the relative velocity difference is greater than the predetermined value $\Delta V_a$ (Yes) in S6, the relative velocity difference between the previously detected target and the newly detected target is large and a mispairing is suspected, so that the process proceeds to S6-1 for further checking. In S6-1, the derivative of the relative velocity with respect to the previously detected target and, if possible, the most recent relative velocity, is obtained (to obtain relative acceleration). Next, the relative velocity with respect to the previously detected target at the next time instant is predicted from the relative acceleration of the previously detected target (S6-2). Then, the time t required for the relative distance to change by the prescribed value is obtained based on the predicted relative velocity of the previously detected target. More specifically, the time t that is required for the relative distance to increase or decrease by the prescribed value, for example, is obtained using the relative velocity of the previously detected target with respect to the radar-equipped vehicle (S7'). The time t can be obtained by the following equation.

$$t = \text{(Value of relative distance that changes)}/\text{(Relative velocity of the previously detected target)}$$

The flow from S8 onward is the same as that shown in FIG. 8. In this way, the determination is made by also applying to the relative velocity a correction corresponding to the amount of change of the relative velocity with time by using the relative acceleration.

The correction corresponding to the amount of change of relative velocity with time will be described in further detail. The flowchart shown in FIG. 8 assumes the case where the relative velocity is constant. On the other hand, the flowchart shown in FIG. 9 assumes the case where the relative velocity changes, and whether a mispairing has occurred or not is determined by applying a correction corresponding to the amount of change of the relative velocity with time.

Figure 10:
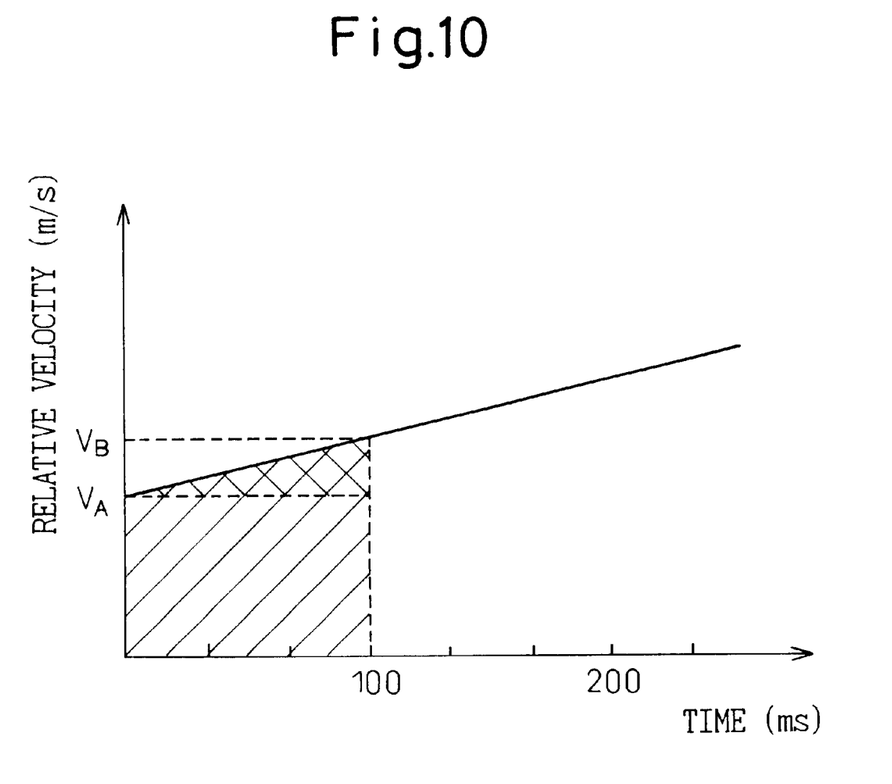
FIG. 10 is a diagram for explaining the modified pairing method shown in FIG. 9.

FIG. 10 is a graph showing how the relative velocity changes in FIG. 9. In FIG. 10, when the initial relative velocity VA of the previously detected target is 10 m/s, and the relative acceleration is 2 m/s$^2$, the relative velocity VB after 100 ms is 10.2 m/s. In the 100-ms period during which the relative velocity changes from VA to VB, the relative distance changes by the distance corresponding to the area of the portion shown by oblique hatching in the graph of FIG. 10. If the relative velocity is constant, the relative distance that changes corresponds to the rectangular area in the portion shown by oblique hatching. On the other hand, if the relative velocity changes, the relative distance that changes corresponds to the sum of the rectangular hatched area and the area of the triangular portion shown by cross hatching.

Referring to the flowchart of FIG. 9, the derivative of the relative velocity (VA) with respect to the previously detected target (the relative acceleration) is obtained in S6-1. Next, the relative velocity (VB) with respect to the previously detected target at the next time instant is predicted from the relative acceleration of the previously detected target (S6-2). Then, the time t required for the relative distance to change by the prescribed value (the distance corresponding to the area of the hatched portion in FIG. 10) is obtained based on the predicted relative velocity (VB) of the previously detected target. More specifically, a time t is obtained that is required for the relative distance to increase or decrease by the prescribed value when the relative velocity of the previously detected target changes with respect to the radar-equipped vehicle. The time t can be obtained by the following equation.

$$t = \text{(Value of relative distance that changes)}/\text{(Relative velocity of the previously detected target)}$$

In the above equation, "Value of relative distance that changes" represents the distance corresponding to the area of the hatched portion in FIG. 10, and "Relative velocity of the previously detected target" is the predicted relative velocity (VB) of the previously detected target. That is, the time t is obtained by obtaining the relative acceleration from the relative velocity of the previously detected target and thereby predicting the relative velocity after a prescribed time, and by applying a correction considering the amount of change of the relative velocity over the prescribed time. As described above, in the modified example shown in the flowchart of FIG. 9, as the time t is obtained by considering the change in the relative velocity, the accuracy of the determination can be enhanced.

In the above embodiment, the FM-CW radar may be configured as a scanning radar.

What is claimed is:

1. A mispairing determination method for an FM-CW radar wherein, when a new target is detected, it is determined whether a distance difference between said newly detected target and a previously detected target is within a predetermined range in said distance difference, and when said distance difference is determined as being within said predetermined range, then the difference between the relative velocity of said newly detected target and the relative velocity of said previously detected target is obtained to determine whether said difference is greater than a predetermined value $\Delta V_a$ (relative velocity difference) wherein, when said difference is greater than said predetermined value, it is determined that said new target is a target obtained as a result of mispairing.

2. A mispairing determination method for an FM-CW radar as claimed in claim 1 wherein, when the difference between the relative velocity of said newly detected target and the relative velocity of said previously detected target is greater than said predetermined value $\Delta V_a$, then the difference between a distance derivative, which is the amount of change in the relative distance during the period of time t, of said newly detected target over a prescribed time and the relative velocity of said previously detected target is obtained, and when said difference is greater than a predetermined value $\Delta V_b$, (the relative velocity difference) which is smaller than the predetermined value $\Delta V_a$, it is determined that said new target is a target obtained as a result of mispairing.

3. A mispairing determination method for an FM-CW radar as claimed in claim 2, wherein a time t required for relative distance to change by a prescribed value is obtained based on the relative velocity of said previously detected target, an amount by which the relative distance to said new target has actually changed during said time t from the time said new target was detected is obtained, and said distance derivative is obtained based on the amount of change of said relative distance.

4. A mispairing determination method for an FM-CW radar as claimed in claim 3, wherein said time t is obtained by obtaining relative acceleration from the relative velocity of said previously detected target and thereby predicting the relative velocity after a prescribed time, and by applying a correction considering the amount of change of said relative velocity over said prescribed time.

5. A mispairing determination method for an FM-CW radar as claimed in claim 1 wherein, when a lateral position difference between said newly detected target and said previously detected target, as well as the distance difference therebetween, is within a predetermined range in said lateral position difference, then it is determined whether the difference between the relative velocity of said newly detected target and the relative velocity of said previously detected target is greater than the predetermined value $\Delta V_a$.

6. A signal processing method for an FM-CW radar wherein, when it is determined that a mispairing has occurred by the FM-CW radar mispairing determination method of claim 1, parameters obtained from the target determined as having occurred due to said mispairing are rejected so that said parameters will not be used for combining or control operations.

* * * * *